United States Patent
Wittenbrink et al.

(10) Patent No.: US 6,590,002 B2
(45) Date of Patent: *Jul. 8, 2003

(54) TEMPERATURE CONTROLLED IN SITU WAX PURIFICATION

(75) Inventors: Robert Jay Wittenbrink, Kingwood, TX (US); Louis Francis Burns, Baton Rouge, LA (US); Gregg Johnston Howsmon, Baton Rouge, LA (US); Geoffrey Rhys Say, Baton Rouge, LA (US); Charles Harrison Mauldin, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/905,231

(22) Filed: Jul. 13, 2001

(65) Prior Publication Data

US 2003/0018087 A1 Jan. 23, 2003

(51) Int. Cl.[7] .............................................. C07C 27/00
(52) U.S. Cl. ......................... 518/715; 518/700; 518/709
(58) Field of Search ................................. 518/700, 709; 515/715

(56) References Cited

U.S. PATENT DOCUMENTS 4,943,672 A * 7/1990 Hamner et al. ............. 585/737

* cited by examiner

Primary Examiner—J. Parsa
(74) Attorney, Agent, or Firm—Mark D. Marin

(57) ABSTRACT

A hydrocarbon wax product from a HCS slurry comprising liquid synthesis product and catalyst particles is purified by circulating the slurry from a synthesis zone with a first temperature through a treatment zone with a second temperature in which a hydrogen-containing treatment gas contacts the slurry. The gas treatment removes impurities from the hydrocarbon wax product and also removes catalyst de-activating species which may be present in the slurry. Purified wax product is separated and removed from the treated slurry via wax withdrawal means. This avoids or minimizes the need for further treating the wax product. Remaining treated slurry may be returned to the synthesis zone.

11 Claims, 1 Drawing Sheet

TEMPERATURE CONTROLLED IN SITU WAX PURIFICATION

FIELD OF THE INVENTION

The invention relates to a slurry hydrocarbon synthesis process in which impurities are removed in situ from a hydrocarbon slurry liquid comprising the raw wax product of the hydrocarbon synthesis reaction. More particularly, this invention relates to independently controlling the temperature at which impurities are removed from the raw wax in an external treatment zone.

BACKGROUND OF THE INVENTION

Hydrocarbon synthesis (HCS) methods utilizing Fischer-Tropsch processes are well known and described in the art. In a Fischer-Tropsch process, synthesis gas ($CO+H_2$) made, e.g. from natural gas, is converted over a catalyst, e.g. a ruthenium, iron, or cobalt catalyst, to form a wide range of products including gaseous and liquid hydrocarbons and oxygenates and a normally solid high paraffin hydrocarbon wax. Typically, Fischer-Tropsch waxes are upgraded by catalytically converting them to lower boiling paraffinic hydrocarbons falling within the gasoline and middle distillate boiling ranges. This treatment primarily involves hydrogenation, e.g. hydrotreating, hydroisomerization and hydrocracking. However, as new markets continue to expand, demand for high quality waxes has increased. The varied and growing uses for high quality Fischer Tropsch waxes include, e.g., food containers, waxed paper, coating materials, electrical insulators, candles, crayons, markers, cosmetics, etc. Stringent purity requirements are set by regulatory authorities, such as the FDA in the United States and the SCF in the European Union, particularly if the wax is to be used in food and drug applications.

Fischer-Tropsch waxes have many desirable properties. They have high paraffin contents and are essentially free of the sulfur, nitrogen and aromatic impurities found in petroleum waxes. However, untreated raw Fischer-Tropsch waxes may contain a small but significant quantity of olefins and oxygenates (e.g. long chain primary alcohols, acids and esters) formed in the slurry as by products of the HCS reaction. Consequently, there is a need to further treat raw Fischer-Tropsch wax to remove these impurities. This additional treatment is part of a time consuming and costly process as Fischer-Tropsch waxes typically undergo hydroprocessing in order to achieve high purity. These purification measures typically occur in another reactor separate from the reactor where the hydrocarbon synthesis has occurred. A more efficient and direct method of producing purified Fischer-Tropsch wax from a hydrocarbon synthesis process provides for such purification processes to be carried out in situ at the reactor site as disclosed in co-pending United States patent application Ser. No. 09/905,232 filed on even date herewith and incorporated herein by reference. However, while the temperature in the main body of a typical Fischer Tropsch reactor is ideal for the hydrocarbon synthesis reaction which occurs there, various other reactions, including wax purification, may occur optimally at other temperatures. Accordingly, it would be an advance if temperature could be independently regulated for selected reactions carried out in situ simultaneously with the hydrocarbon synthesis reaction.

A preferred mode for operating the Fischer-Tropsch process is a slurry-type process which may be carried out, e.g. in moving bed systems or slurry reactors. The slurry comprises slurry liquid and finally divided catalyst, wherein the catalyst particles are suspended in a liquid hydrocarbon and the CO/hydrogen mixture is forced through the catalyst/hydrocarbon slurry allowing good contact between the CO/hydrogen and the catalyst to initiate and maintain the hydrocarbon synthesis process.

Advantages of a slurry-type process, over that of a fixed bed process are that there is better control of the exothermic heat produced in the Fischer-Tropsch process during the reaction and better control over catalyst activity maintenance by allowing recycle, recovery, and rejuvenation procedures to be implemented. The slurry process can be operated in a batch or in a continuous cycle, and in the continuous cycle, the entire slurry can be circulated in the system allowing for better control of the primary products residence time in the reaction zone.

Slurry reactors are well known for carrying out highly exothermic, three phase slurry-type Fischer-Tropsch reactions. Reactors in which such three phase slurry-type hydrocarbon synthesis processes are carried out are sometimes referred to as "bubble columns", as is disclosed in U.S. Pat. No. 5,348,982. Bubble column reactors typically have a multiplicity of tubes suspended within a shell type housing, the tubes being filled with a heat transfer medium, e.g. water, which absorbs the heat generated by the exothermic reaction occurring on the shell side of the of the tubes in the main body of the housing. In such a three-phase hydrocarbon synthesis (HCS) process, a synthesis gas comprising a mixture of $H_2$ and CO (syngas) is bubbled up as a third phase through a slurry in the reactor in which the slurry comprises liquid hydrocarbons and dispersed solid particles comprising a suitable Fischer-Tropsch type hydrocarbon synthesis catalyst. The catalyst particles are typically kept dispersed and suspended in the liquid by the lifting action of the syngas bubbling up through the slurry and by hydraulic means. Typically, the slurry liquid is the product of the reaction, usually $C_5-C_{100}$ hydrocarbons. Preferably, the slurry liquid comprises primarily high boiling paraffins (Fischer-Tropsch waxes).

SUMMARY OF THE INVENTION

The invention relates to a process for purifying in situ the raw wax product of a slurry type hydrocarbon synthesis (HCS) process in a treatment zone external of the synthesis reaction zone, wherein the reaction temperature in the external treatment zone is controlled independently from the temperature in the synthesis reaction zone. The process involves contacting a synthesis gas comprising a mixture of $H_2$ and CO with a synthesis slurry comprising solid particulate hydrocarbon synthesis catalyst and hydrocarbon liquid in a synthesis zone. Reaction conditions in the synthesis zone include a first reaction temperature effective to form hydrocarbons, at least a portion of which are liquid at said reaction conditions. In the inventive process, the synthesis slurry exits the reactor and is passed into a treatment zone external of the main slurry body. A treatment gas is passed into the treatment zone and contacts the synthesis slurry to at least partially removes impurities therefrom, thus forming a treated slurry. The treatment gas may also optionally act as a lift gas in the treatment zone. The reaction conditions in the treatment zone include a second reaction temperature which is controlled independently from the first reaction temperature in the hydrocarbon synthesis zone. The treated slurry is contacted with wax withdrawal means wherein at least a portion of the purified liquid hydrocarbon wax is separated from the treated slurry. The treated slurry may then be passed back into the synthesis zone from which it was drawn. In a preferred embodiment, off gas produced in the treatment zone is removed from the purified slurry by passing it through gas disengaging and removal means prior to withdrawal of purified wax product.

DETAILED DESCRIPTION OF THE INVENTION

Figure 1:
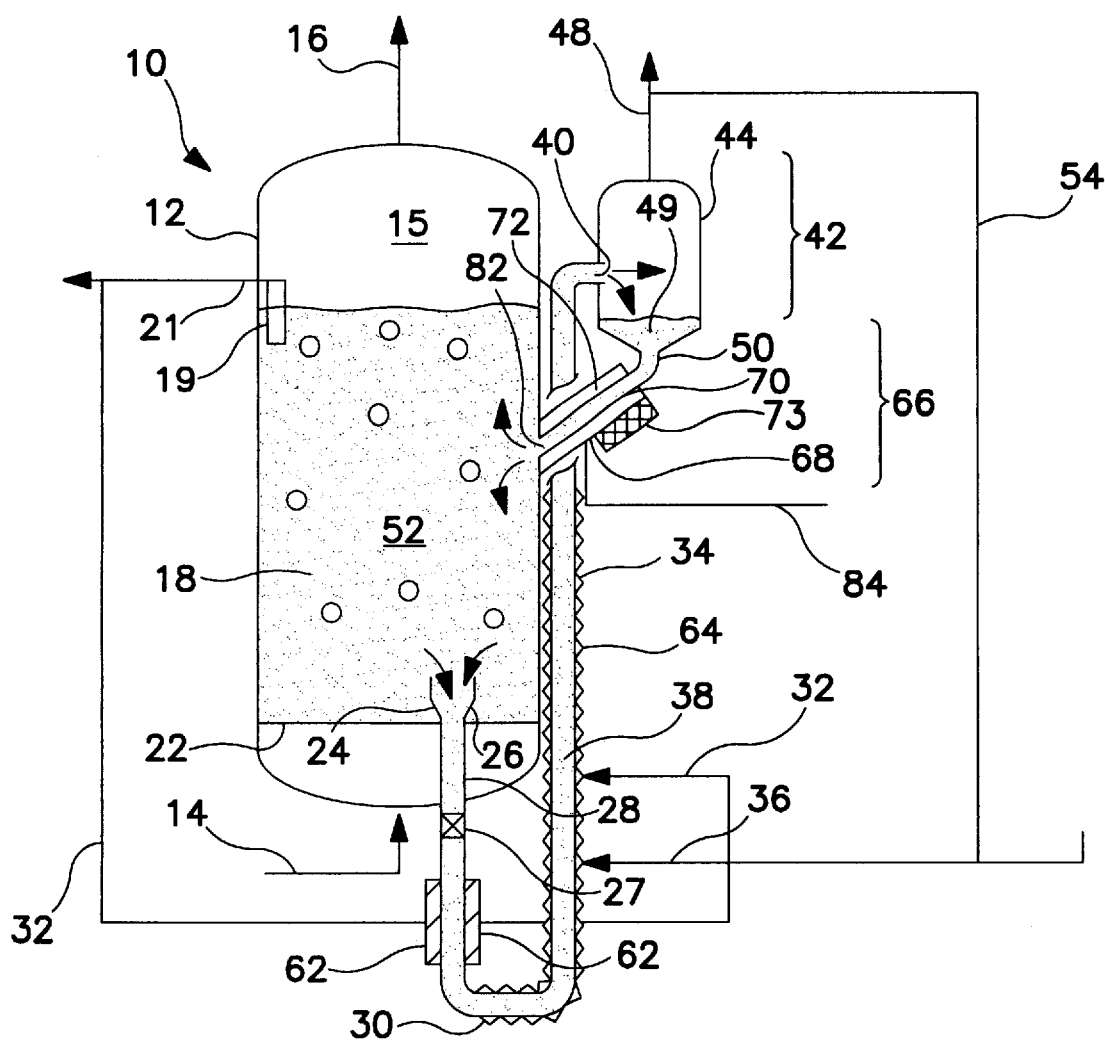
FIG. 1 is a schematic cross section of a particular embodiment of a slurry-type hydrocarbon synthesis reactor with an external lift pipe comprising a treatment zone useful for practicing the process of the invention.

The invention relates to a process for purifying raw liquid wax product in situ in a slurry type hydrocarbon synthesis (HCS) process in a treatment zone external of the synthesis reaction zone wherein the reaction temperature in the treatment zone is controlled independently from the temperature in the hydrocarbon synthesis zone. The treatment zone is external to the synthesis zone and may be, e.g. a hollow lift pipe or conduit in internal fluid communication with the synthesis slurry in the synthesis zone of a Fischer-Tropsch reactor. An external treatment zone enables independent control of the treatment zone temperature. Treatment gas is injected into the treatment zone in which it mixes with synthesis slurry from the reactor and at least partially removes impurities such as olefins, primary and secondary alcohols, acids, esters, or mixtures thereof which contaminate the wax. The treatment gas may also optionally serve as a lift gas. Preferred embodiments include an external lift pipe and achieve slurry circulation between the synthesis zone, external treatment zone, offgas disengaging and separating means and back into the synthesis zone as a result of the lifting action of the rejuvenating gas in the lift pipe and by gravity. In a preferred embodiment described below, no slurry pumps are used or required.

One particular embodiment of the invention is illustrated in schematic cross section in FIG. 1. Slurry type HCS reactor 10, comprises a cylindrical steel vessel 12 containing synthesis slurry 18 in hydrocarbon synthesis (HCS) zone 52. Gas feed line 14 feeds the synthesis gas (syngas) into the bottom of the reactor. Reactor 10 also comprises gas product line 16 at the top for removing gas products of the Fischer-Tropsch type HCS reaction and unreacted syngas which collect in gas space 15. Synthesis slurry 18 comprises hydrocarbon liquid in which is dispersed and suspended a particulate HCS catalyst. The slurry liquid comprises HCS reaction products which are liquid at the slurry reaction conditions, preferably Fischer-Tropsch waxes with small amounts of primary and secondary alcohols, acids, esters, olefins or mixtures thereof. Gas bubbles, shown as small circles, comprise the uprising syngas and gas products of the HCS reaction, a significant amount of which comprise steam or water vapor. The syngas is bubbled up into the bottom of synthesis slurry 18 through suitable gas distribution means located across the surface of tray 22.

Hydrocarbon liquid product withdrawal means 19, such as a filter, is located within synthesis zone 52 for withdrawing liquid hydrocarbon products i.e. raw Fischer-Tropsch wax from the reactor, via line 21. A gas disengaging downcomer 24 includes a substantially vertical, hollow conduit 28 which opens at its top into a vertically extending and upwardly opening gas disengaging cup 26, for disengaging gas bubbles from the slurry in the synthesis reaction zone. Conduit 28 is provided with conduit valve 27. Conduit 28 exits the reactor where it is provided with heat exchanger 62 and then bends laterally over transverse portion 30 which turns upward into hollow lift pipe 34, the interior 38 of which is the treatment zone.

Thus, synthesis slurry 18 exits the reactor via conduit 28 and passes through heat exchanger 62 which, in this embodiment, is designed to cool the slurry below the reactor temperature before traveling over transverse portion 30 and up into the interior, treatment zone 38, of lift pipe 34. In this embodiment, lift pipe 34 and transverse portion 30 are wrapped in cable heaters 64. The combination of the heaters 64 and the heat exchanger 62 are designed to heat/cool the exiting synthesis slurry above or below the synthesis zone temperature. Hydrogen-containing treatment gas is passed, via line 36, into the interior 38 of lift pipe 34 near the bottom thereof, in which it contacts impurities such as olefins and oxygenates primary and secondary alcohols, acids, esters, or mixtures thereof) in the slurry liquid to at least partially remove them and form a treated slurry and a reaction off-gas. The treatment gas injected into the treatment zone comprises hydrogen which may contain other gases such as nitrogen, $CO_2H_2O$, $CH_4$, $C_2$–$C_4$ hydrocarbons. Optionally, hydrocarbon synthesis product from line 21 (i.e. untreated Fischer-Tropsch wax) may be recycled via line 32 such that it enters the interior treatment zone 38 of lift pipe 34 for treatment.

In this embodiment, the treatment gas also acts as a lift gas to lift treated slurry up, over and out of the upper opening 40 and into gas disengaging and separating means 42 comprising outboard vessel 44. In gas disengaging means 42, off-gas produced during the wax treatment reaction is separated from the treated slurry 49 and removed via gas line 48. Optionally, all or a portion of the off-gas may be recycled back into the treatment zone via line 54 after it has been treated to remove oxygenates and other impurities such as nitrogen so as not to re-contaminate the treated wax.

In this embodiment, treated slurry 49 from which the offgas has been removed, falls down into the bottom portion of the outboard vessel 44 and from there it flows through a hollow return conduit 50 and back into the synthesis zone 52 within reactor 10 in which it mixes with the synthesis slurry 18. Wax withdrawal means 66 comprise return conduit 50 with semipermeable wall 70 surrounded by a larger diameter tubular member 68 forming an annular space 72 therebetween. Return conduit 50 may also be provided with heat exchanger 73. Semi-permeable wall 70 allows purified wax filtrate but not catalyst particles to pass into annular space 72 thus withdrawing purified wax filtrate from the treated slurry passing through the interior of the slurry return conduit 50. The purified wax filtrate may be collected in situ from annular space 72 via wax product line 84. Shut-off valve 82 allows reactor 10 to be isolated from the external units if necessary, e.g. for separate maintenance and repair. Optionally, gas disengagement means 42 may be provided with a wax withdrawal means, such as a filter (not shown), for withdrawing purified wax from treated slurry.

In the present invention process, the degree of wax purification can be adjusted by independently controlling the temperature in the treatment zone irrespective of the temperature of the adjacent hydrocarbon synthesis zone. In many instances, this involves conducting the wax treatment at temperatures higher than those in the adjacent reactor. As disclosed in U.S. Pat. No. 5,288,673, temperature control in the lift tube may be achieved by one or more of either increasing or decreasing the slurry residence time in the purification zone, so as to utilize the exothermic nature of the rejuvenation reactions, by insulating the rejuvenation tubes, by introducing heat or a cooling medium into the zone, by preheating the rejuvenating gas, etc. The '673 patent teaches that the temperature in the rejuvenation zone should be high enough to remove any entrained and dissolved CO and low enough to minimize methane formation and wax hydrogenolysis. These teachings apply to the present invention also.

To achieve optimal wax purification, the treatment temperature in the treatment zone is controlled so as to range from about 193–232° C. preferably about 210° C. to 232° C. The lower temperatures are effective in those instances in which the wax contains a minimum of impurities and catalyst deactivating species such as when the temperature in the synthesis reaction zone is relatively low. Higher temperatures are needed in those instances when the wax contains higher levels of impurities, such as when temperatures in the synthesis reaction zone are relatively high. Another advantage of the present invention process is the simultaneous removal of catalyst deactivating species when catalyst particles in the circulating slurry are contacted with the same treatment gas that serves to remove impurities from the wax.

Hydrocarbon synthesis processes which benefit by the use of the present invention are carried out under slurry conditions, at elevated temperatures and pressures. Pressures typically range from 1–100 atmospheres, preferably 10–50 atmospheres, more preferably 15–40 atmospheres.

Temperatures may range from about 175° C. to 450° C., preferably 175° C. to 420° C., more preferably 175° C. to 300° C. For Fischer-Tropsch processes, hydrogen to carbon monoxide ratios in the feed gas may range from about 0.5 to 4.0, preferably 1.0 to 2.75, more preferably about 1.5 to 2.5. Synthesis gas feed is injected at superficial gas velocities ranging from about 1 to 30 cm/sec through gas injection means such as bubble caps, spargers or multi cone arrays into the main slurry reaction zone in which are located hydrocarbon synthesis product (i.e. liquid wax) and catalyst. In a slurry type operation, the slurry usually comprises about 10 wt % to 50 wt % catalyst solids, preferably 30 wt % to 40 wt % suspended catalysts solids. The slurry liquids in which the catalyst is dispersed are the products of the reaction which are liquid at reaction conditions. Preferably the slurry liquid comprises primarily high boiling paraffins with small amounts of primary and secondary alcohols, acids, esters, or mixtures thereof. Preferred slurry materials are Fischer-Tropsch waxes and hydrocarbons larger than $C_{10}$.

The hydrocarbon synthesis reaction is highly exothermic and the heat of reaction is removed by a heat transfer material which is either circulating on the shell side of a shell and tube reactor when the reaction takes place in the tube, or through the tubes when the reaction takes place on the shell side. The common heat transfer material can be any material having a high heat capacity, whether or not it undergoes a phase change. Preferably the heat transfer fluid is water.

The catalyst employed in the hydrocarbon synthesis process is any catalyst known to be active in Fischer-Tropsch synthesis. For example, Group VIII metals, whether supported or unsupported, are known Fischer-Tropsch catalysts. Of these, iron, cobalt and ruthenium are preferred, particularly iron and cobalt, most particularly cobalt. A preferred catalyst is supported on an inorganic refractory oxide selected from Groups III, IV, V, VI, and VIII of the Periodic chart of the elements. Preferred supports include silica, alumina, silica-alumina, the Group IVB oxides, most preferably titania (primarily in the rutile form), and generally supports having a surface area of less than about 100 m²/gm, preferably 70 m²/gm and less.

The catalytic metal is present in catalytically active amounts, usually about 1–100 wt %, the upper limit being attained in the case of iron catalyst, preferably 2–40 wt %, more preferably about 2–25 wt %. Promoters may be added to the catalyst and are well known in the Fischer-Tropsch catalyst art. Promoters can include ruthenium (when it is not the primary catalytic metal), rhenium, hafnium, cerium, and zirconium, and are usually present in amounts less than the primary catalytic metal (except for ruthenium which may be present in co-equal amounts), but the promoter:metal ratio should be at least about 1:10. Preferred promoters are rhenium and hafnium. Useful catalysts are described in U.S. Pat. Nos. 4,568,663; 4,663,305; 4,542,122.

Catalyst particle size is important and particle sizes may range from that which is reasonably filterable to that which is reasonably able to be dispersed in a slurry phase. Particles sizes of 1–200 microns, preferably about 20 to 150 microns meet these requirements. Catalyst preparation may be accomplished by a variety of techniques. A typical catalyst preparation may involve impregnation, by incipient wetness or other known techniques of, e.g., a cobalt nitrate salt onto a titania, silica, or alumina support, optionally followed or preceded by impregnation with a promoter material, e.g., perrhenic acid. Excess liquid is removed and the catalyst precursor dried at 100° C. to 125° C. Following drying or as a continuation thereof, the catalyst is calcined at about 300° C. –500° C. to convert the salt or compound to its corresponding oxide(s). The oxide is then reduced by treatment with hydrogen or a hydrogen containing gas at about 300° C. –500° C. for a period of time sufficient to substantially reduce the oxide to the elemental or catalytic form of the metal. Some prefer an additional cycle of oxidation/reduction. Another, and sometimes preferred method for catalyst preparation is disclosed in U.S. Pat. No. 4,621,072 incorporated herein by reference.

In Fischer-Tropsch processes carried out according the present invention, the extent of the wax purification reaction occurring in the lift tube at various temperatures can be determined by measuring the relative ester content via infrared spectrometry. The oxygenate content of the wax (as exemplified by the average ester content) reflects the extent of purification occurring in the lift tube. The difference in temperature between the contents of the lift tube and the contents of the reactor synthesis slurry can then be correlated to the extent of purification occurring in the lift tube. The following non-limiting Examples further illustrate the inventive process.

EXAMPLES

A mixture of hydrogen and carbon monoxide synthesis gas (H2:CO=2.1) was converted to paraffins in a slurry bubble column reactor equipped with an external lift tube, the interior of which defined a treatment zone. The catalyst utilized was a titania supported cobalt rhenium catalyst similar to that described in U.S. Pat. No. 4,568,663. The hydrocarbon synthesis reaction in the Fischer Tropsch reactor was conducted at 275 psia. The feed was introduced at a linear velocity of 16.7 cm/sec and the CO conversion was fifty percent.

In Example 1, the slurry conduit valves between the reactor and the external lift tubes were closed, thus preventing synthesis slurry from leaving the reactor.

In Examples 2a, 2b, 3a and 3b the slurry conduit valves were open, allowing the synthesis slurry to exit the reactor and circulate through the lift tube. Hydrogen treatment gas was introduced into the interior of the lift tube at about ninety standard liters per minute. The temperature in the lift tube was controlled by heat exchangers and heaters.

The average ester content of Fischer-Tropsch wax samples withdrawn directly from the reactor was analyzed via infrared spectrometry. The results are shown in Table 1.

TABLE 1

| Example | Reactor (Synthesis) Temp. (° C.) | Lift Tube (Treatment) Temp. (° C.) | ΔTemp. (° C.) (Treatment Temp. minus Synthesis Temp.) | Average Ester Content (μmoles/gram-wax) |
|---|---|---|---|---|
| No. 1 | 210 | — | — | 3.50 |
| No. 2a | 210 | 199 | −11 | 1.75 |
| No. 2b | 210 | 210 | 0 | .50 |
| No. 3a | 221 | 210 | −11 | 1.10 |
| No. 3b | 221 | 232 | +11 | not detected |

As the results show, the average ester content decreased in all examples where the slurry was allowed to circulate through the lift tube into which treatment gas was introduced. Moreover, as temperature in the lift tube increased relative to the temperature in the reactor, the average ester content decreased. Thus, carrying out the wax treatment process at increasing temperatures over reactor synthesis temperature increased the extent of wax purification in these examples. The advantage of independently controlling the temperature during wax purification in the external lift tube is evident from these results.

Finally, it will be appreciated that while the practice of the invention finds particular use with removing impurities from the raw wax product of an HCS reaction in situ in a hydrocarbon slurry liquid, it is not intended to be limited to this particular embodiment. It is understood that various other embodiments and modifications in the practice of the invention will be apparent to, and can be readily made by, those skilled in the art without departing from the scope of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A slurry hydrocarbon synthesis process for forming hydrocarbons comprising (a) contacting a synthesis gas comprising a mixture of $H_2$ and CO with a solid particulate hydrocarbon synthesis catalyst in a hydrocarbon synthesis slurry comprising said catalyst and a hydrocarbon liquid in a synthesis zone under reaction conditions which include a first reaction temperature effective to form said hydrocarbon liquid from said synthesis gas, at least a portion of which is liquid hydrocarbon wax;

(b) introducing a portion of said hydrocarbon synthesis slurry into a treatment zone external to said synthesis zone;

(c) introducing a hydrogen-containing treatment gas into said treatment zone wherein said treatment gas contacts said portion of said hydrocarbon synthesis slurry under reaction conditions which include a second reaction temperature to form a treated slurry comprising treated catalyst particles and treated liquid wax; and, (d) contacting said treated slurry with wax withdrawal means to separate at least a portion of said treated liquid wax from said treated slurry.

2. The process of claim 1 further including the step of passing said treated slurry through gas removal means prior to step (d).

3. A process according to claim 1 wherein said catalyst comprises at least one supported Group VIII metal.

4. A process according to claim 3 wherein said metal comprises cobalt.

5. A process according to claim 4 wherein said support material is titania.

6. A process according to claim 1 wherein said treatment zone comprises a substantially vertical conduit.

7. A process according to claim 6 wherein said treatment gas acts as a lift gas in said substantially vertical conduit.

8. A process according to claim 1 wherein said treated slurry is re-introduced into said synthesis zone.

9. A process according to claim 1 wherein said second reaction temperature is equal to or greater than said first reaction temperature.

10. A process according to claim 1 wherein said second reaction temperature ranges from about 199° C. to about 232° C.

11. A process according to claim 10 wherein said second reaction temperature ranges from about 210° C. to about 232° C.

* * * * *